US012778726B2

(12) United States Patent
Steger

(10) Patent No.: US 12,778,726 B2
(45) Date of Patent: Nov. 3, 2026

(54) DENTAL BLANK AND POSITIONING AID FOR DENTAL BLANKS

(71) Applicant: Heinrich Steger, Sand in Taufers (IT)

(72) Inventor: Heinrich Steger, Sand in Taufers (IT)

( * ) Notice: Subject to any disclaimer, the term of this patent is extended or adjusted under 35 U.S.C. 154(b) by 654 days.

(21) Appl. No.: 18/143,914

(22) Filed: May 5, 2023

(65) Prior Publication Data

US 2023/0372071 A1 Nov. 23, 2023

(30) Foreign Application Priority Data

May 19, 2022 (EP) .................................... 22174456

(51) Int. Cl.
*B32B 3/02* (2006.01)
*A61C 13/00* (2006.01)

(52) U.S. Cl.
CPC ............ *A61C 13/0022* (2013.01); *B32B 3/02* (2013.01)

(58) Field of Classification Search
CPC ........ B32B 3/00; B32B 3/02; B32B 2264/107
See application file for complete search history.

(56) References Cited

U.S. PATENT DOCUMENTS

| | | | | |
|---|---|---|---|---|
| 10,265,145 | B2 * | 4/2019 | Steger | A61C 13/0022 |
| 10,799,326 | B2 | 10/2020 | Gebhardt et al. | |
| 2016/0317258 | A1 * | 11/2016 | Steger | A61C 13/0022 |
| 2019/0046305 | A1 | 2/2019 | Gebhardt et al. | |

FOREIGN PATENT DOCUMENTS

| | | | |
|---|---|---|---|
| EP | 3095412 | A2 | 11/2016 |
| WO | 2020058442 | A2 | 3/2020 |

OTHER PUBLICATIONS

International Search Report for International Application No. PCT/EP2021/081521, mailed Jul. 2, 2022, 3 pages.
International Written Opinion for International Application No. PCT/EP2021/081521, mailed Jul. 2, 2022, 6 pages.

* cited by examiner

*Primary Examiner* — Elizabeth E Mulvaney
(74) *Attorney, Agent, or Firm* — Workman Nydegger

(57) ABSTRACT

A blank (1) for producing a dental element, wherein the blank (1) has a cylindrical base body (5) with a cover surface (7), a bottom surface (8) and an outer surface (20), wherein there is inserted into the outer surface (20) at least one positioning groove (4), wherein there are provided a first receiving member and a spaced-apart second receiving member, wherein each receiving member has at least one groove (21), which is arranged laterally in the outer surface (20), wherein the groove (21) runs from the bottom surface (8) in the direction of the cover surface (7) and has a length (h3+h/2), which is smaller than the height (h) of the base body (5), wherein the groove (21) has a support surface (3) at the upper end, wherein there is provided a depression (2) in the support surface (3), which extends in the direction of the cover surface (7).

18 Claims, 7 Drawing Sheets

DENTAL BLANK AND POSITIONING AID FOR DENTAL BLANKS

Figure 1A:
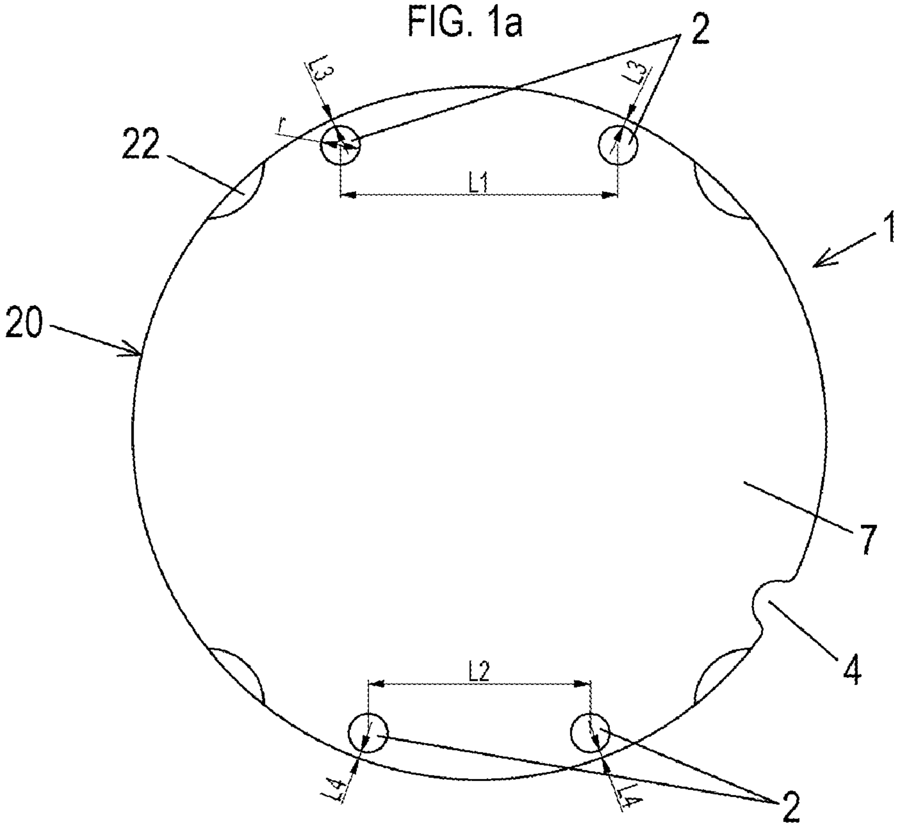

The present invention relates to a blank for the production of a dental element having a cylindrical base body, wherein the base body has a cover surface, a bottom surface and an outer surface, wherein there is inserted into the outer surface at least one positioning groove. The invention further relates to a transport system, a storage system and/or a clamping device for a blank.

BACKGROUND OF THE INVENTION

Dental blanks are required for the production of dental elements such as, e.g. dental models or dental spare parts. The blank is transported using a transport system to a clamping device, is positioned therein and processed using a machine for chipping into the desired dental element.

U.S. Pat. No. 10,799,326 B2 discloses a dental blank, the base shape of which being circular cylindrical. The dental blank has a positioning groove for positioning within the machine holder.

In WO 2020/058442 A2 there is described a blank, which has so-called "key structures", which enable an exact repositioning thereof. Knobs, recesses and the like as possible shapes of the key structures are mentioned.

A blank of this type is described in EP 3 095 412 A2. The blank has a cylindrical base body with a positioning groove for positioning within a machine holder. The transport of the blank is realized via a transport device, which is able to receive the blank.

BRIEF DESCRIPTION OF THE INVENTION

The transport of a blank from a storage system to a clamping device and the exact positioning require, according to prior art, in part complex, cumbersome and expensive receiving devices. It is thus the task of the present invention to provide a blank and a transport device for the blank, whereby transport, storage and positioning may be realized in a fully automatic and simplified manner.

This task is solved by a blank for the production of a dental element, wherein the blank has a cylindrical base body with a cover surface, a bottom surface and an outer surface, wherein there is inserted into the outer surface at least one positioning groove, characterized in that there are provided a first receiving member and a spaced-apart second receiving member, wherein each receiving member has at least one groove, which is arranged laterally in the outer surface, wherein the groove runs from the bottom surface in the direction of the cover surface and has a length, which is smaller than the height of the base body, wherein the groove has a support surface at the upper end, wherein there is provided in the support surface a depression, which extends in the direction of the cover surface.

The groove at the outer surface extends from the outer surface laterally in the direction of the central axis of the blank and is open downwards towards the bottom surface and limited upwards towards the cover surface by the support surface. The support surface is preferably flat, especially preferably in parallel to the cover surface, and has a depression oriented towards the cover surface.

In the following, the length of the groove is also designated as the sum of the half of the height of the base body plus the height of the support surface, wherein the height of the support surface is the distance between the centre of the base body and the support surface.

The first receiving member makes it possible to receive the blank by means of a transport system having a corresponding positioning aid. The positioning aid for the transport system comprises as follows:

- a transport system partial mould matching the outer surface,
- a transport system support surface matching the support surface and
- a transport system projection matching the depression.

In this way, the transport system is connected to the blank via the positioning aid in a form-fit but releasable manner in the region of the receiving member. The blank lies with the support surface on the transport system support surface matching the support surface such that a transport is possible without using grippers, for example. The transport system projection projects into the depression, thus stabilizing the blank at the transport system.

The second receiving member makes it possible to receive the blank in a storage system using the corresponding storage system positioning aid. The positioning aid for the storage system comprise as follows:

- a storage system partial mould matching the outer surface,
- a storage system support surface matching the support surface and
- a storage system projection matching the depression.

Analogously to the transport system, also the storage system may establish a form-fit and releasable connection in the region of the receiving member with the blank via the corresponding positioning aid. The blank lies with the support surface on the storage system support surface matching the support surface such that storage or positioning is possible without using grippers, for example. The storage system projection projects into the depression, thus stabilizing the blank at the storage system or the clamping device.

The receiving members also make possible the simple accommodation by a corresponding transport system and the exact transfer to a storage system or a clamping device.

While the positioning groove is intended for the positioning of the blank in a clamping device, the two receiving members are intended for a smooth and automatized transport, on the one side, and for a possible storage between storage system, transport system or clamping device or tool room, respectively, on the other side.

The two receiving members are distributed along the circumference of the blank, being situated opposite to one another.

There is preferably provided that each receiving member has at least two grooves, as this will increase the stability during transport, storage and positioning. There are then provided two receiving members with respectively one pair of depressions. Each receiving member then has preferably two grooves, which are arranged laterally within the outer surface, wherein each groove extends from the bottom surface in the direction of the cover surface and has a length, which is smaller than the height of the base body, wherein each groove has a support surface at the upper end of the groove, wherein there is provided in each support surface a depression, which extends in the direction of the cover surface.

In this embodiment variant, the pair of depressions of the first receiving member has a first distance L1 and the pair of depressions of the second receiving member has a second distance L2, wherein the two distances L1, L2 are preferably different to one another. In this way, coding is possible, which will ensure the correct insertion of the blank or prevent the wrong insertion of the blank, respectively.

The distances L3, L4 of each recess of the circumference of the blank may be identical or different.

The groove at the outer surface, which extends from the bottom surface in the direction of the cover surface, may have any length possible. For example, this may be between 20% and 80% of the height of the base body. Adjustment to the two positioning aids, however, is preferred. Thereby, the height of the support surface starting from the base body centre is taken as a reference plane, and this height of the support surface is chosen such that the difference between base body centre and the height of the support surface will be constant, irrespective of the height of different blanks.

For this reason, there is provided in one embodiment variant that the groove has a length, which extends about the height of the support surface starting from the base body centre.

The positioning groove preferably extends across the entire height of the base body.

The depression is preferably a bore having a radius r. In an especially preferred embodiment variant there is provided that the depression is a through-hole, which is a bore having a radius r.

The groove has preferably the shape of a semi-circle, and in the region of the through-hole it has a curvature radius, which corresponds to the radius of the bore. This facilitates the insertion of the two positioning aids.

The base body has, for the ease of manufacture and further processing, in the simplest case an essentially straight circular cylinder shape.

For processing the blank in the clamping device, there may be provided that there is provided by the cover surface at least one lateral holding surface, which is configured as a recess and extends from the cover surface in the direction of the bottom surface across a height of the lateral holding surface starting from the base body centre, i.e. across merely a part of the height of the base body.

The blank may comprise at least two, preferably at least three, lateral holding surfaces.

There may be further provided at least one holding surface on a height of the holding surface starting from the base body centre, which is arranged between cover surface and bottom surface, has a clearly defined height of the holding surface starting from the base body centre and is configured to be in parallel to the cover surface, wherein there is provided between the holding surface and the bottom surface a recess within the outer surface.

The blank may have different materials or be formed in one part. In both embodiment variants, however, the base body has a millable raw material.

In the single-part embodiment variants, the blank has, for example, a plastic material.

An alternative embodiment variant provides for a multi-part base body. This may comprise a holder and a millable raw material body.

The holder is connected to the raw material body preferably in a releasable way.

In the case of multi-part base bodies, the holder may, for example, comprise all functions for holding or for positioning, or it is possible a combination, in which the raw material body assumes, in part, the function for holding and for positioning.

Multi-part base bodies have the advantage that the raw material body need not necessarily be pre-processed to provide the functions for holding or positioning.

The raw material body comprises, for example, a plastic material or zirconium(IV) oxide.

In all embodiment variants, there may be provided a label. This label may have information for the identification of the blank. For example, the label may comprise a QR code, a bar code, a data matrix or the like.

As already initially explained, there is adapted for the blank a device for transporting and positioning a blank of the type mentioned. For this reason, the invention also relates to a transport system for a blank of the type mentioned having a positioning aid, wherein the positioning aid for the transport systems comprises as follows:

- a transport system partial mould matching the outer surface,
- a transport system support surface matching the support surface and
- a transport system projection matching the depression.

Furthermore, the invention relates to a storage system for a blank of the type mentioned having a storage system positioning aid, wherein the positioning aid for the storage system comprises as follows:

- a storage system partial mould matching the outer surface.
- a storage system support surface matching the support surface and
- a storage system projection matching the depression.

The configuration provides for a matching and form-fit accommodation.

Further, the transport support surface and/or the storage system support surface may be in parallel to the support surface.

DETAILED DESCRIPTION OF THE INVENTION

Using the figures attached and the following description, further details and advantages of the invention are shown.

FIG. 1*a* shows a top view of the cover surface of a blank according to the invention.

Figure 1B:
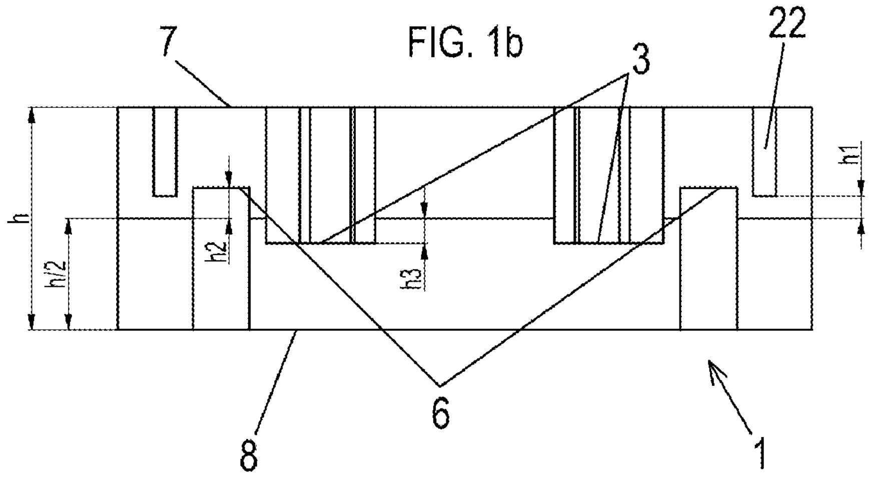

FIG. 1*b* shows the side view of a blank according to the invention of FIG. 1*a*.

Figure 1C:
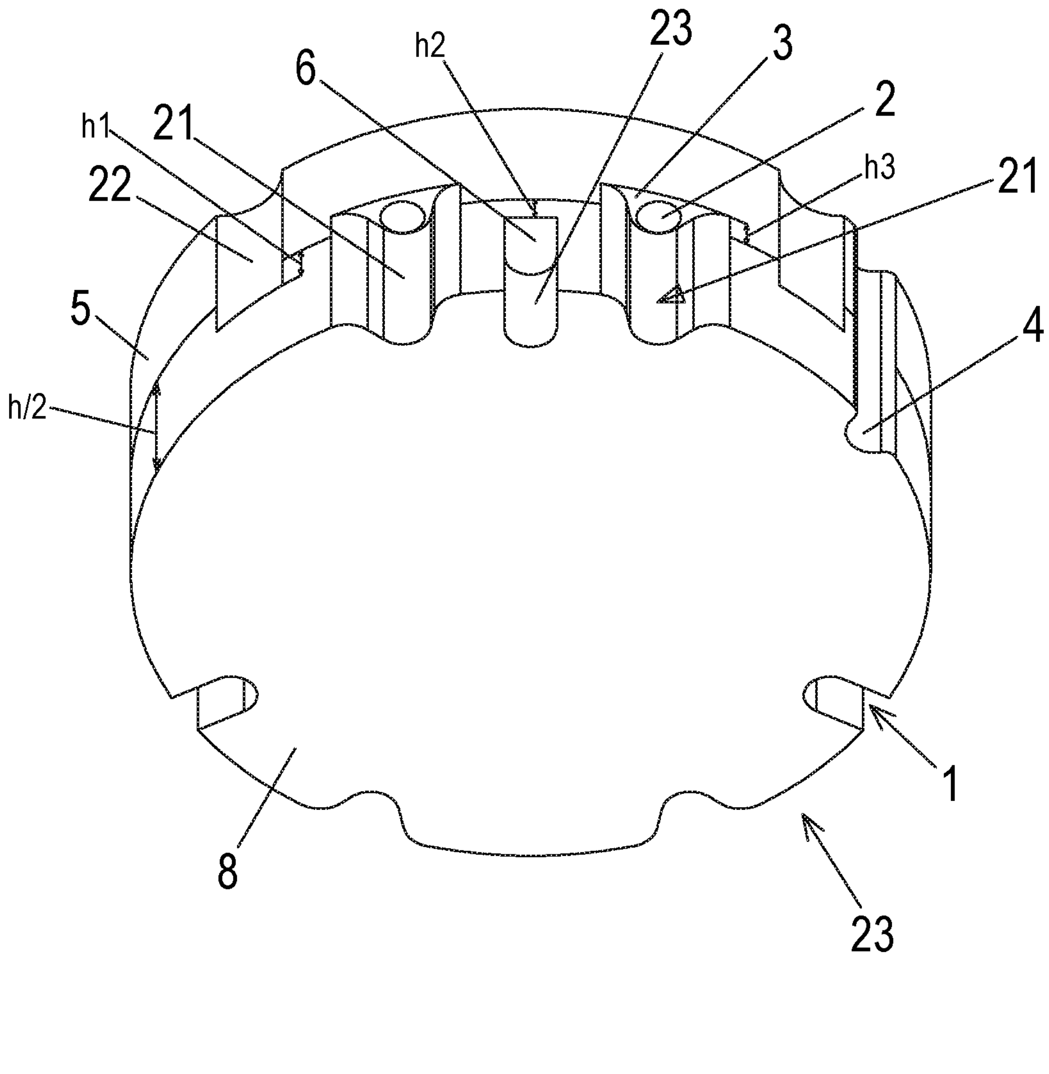

FIG. 1*c* shows an inclined view from the bottom onto the bottom surface of the blank according to the invention of FIG. 1*a*.

Figure 2:
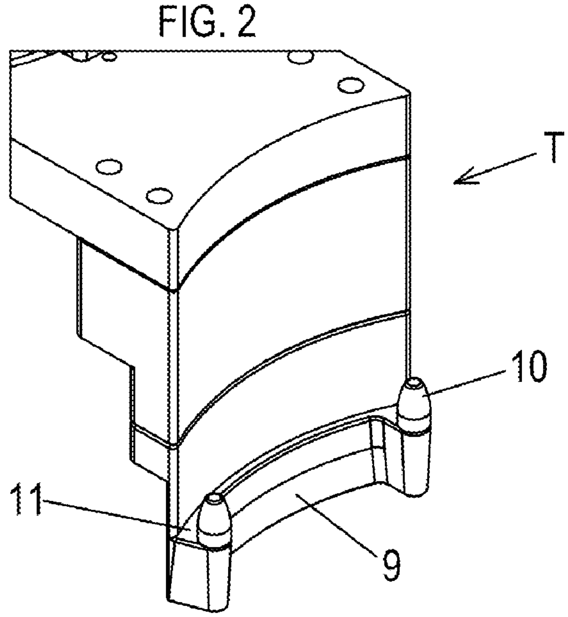

FIG. 2 shows a section of a transport system of a device according to the invention.

Figure 3A:
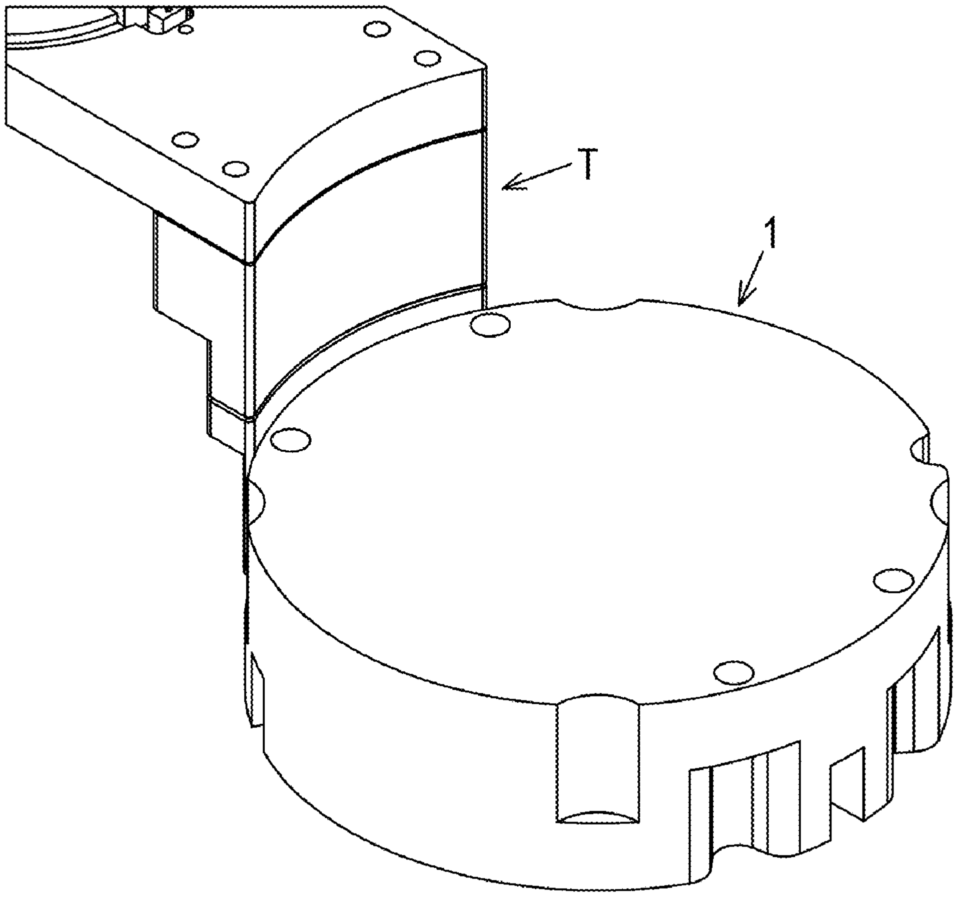

FIG. 3*a* shows the section of the transport system of FIG. 2 with a blank according to the invention in an inclined sectional view.

Figure 3B:
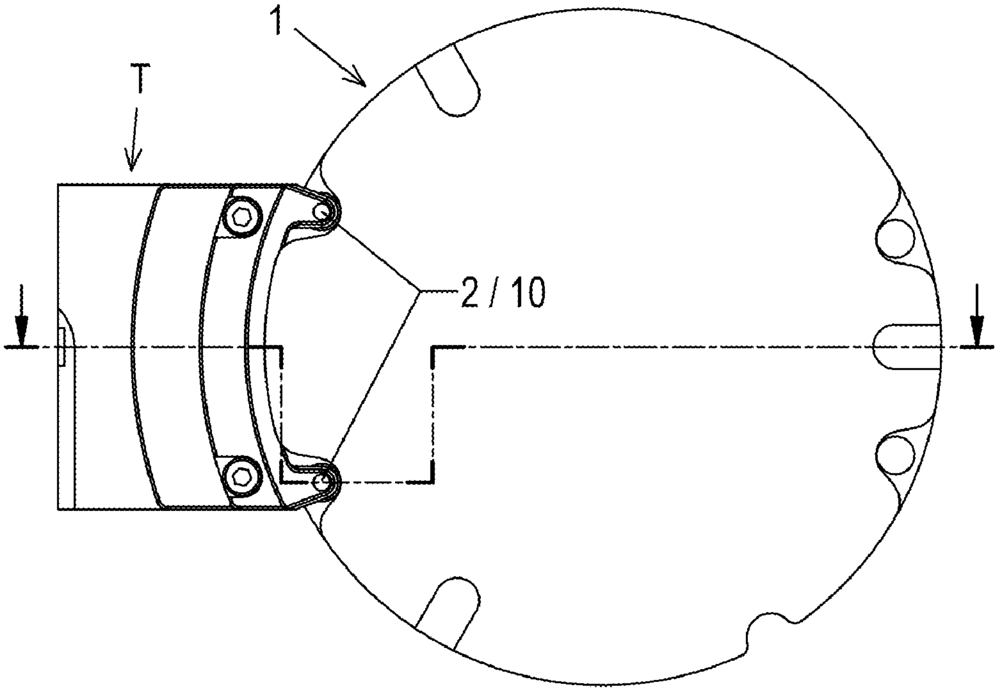

FIG. 3*b* shows the section of the transport system of FIG. 2 with a blank according to the invention in a bottom view.

Figure 3C:
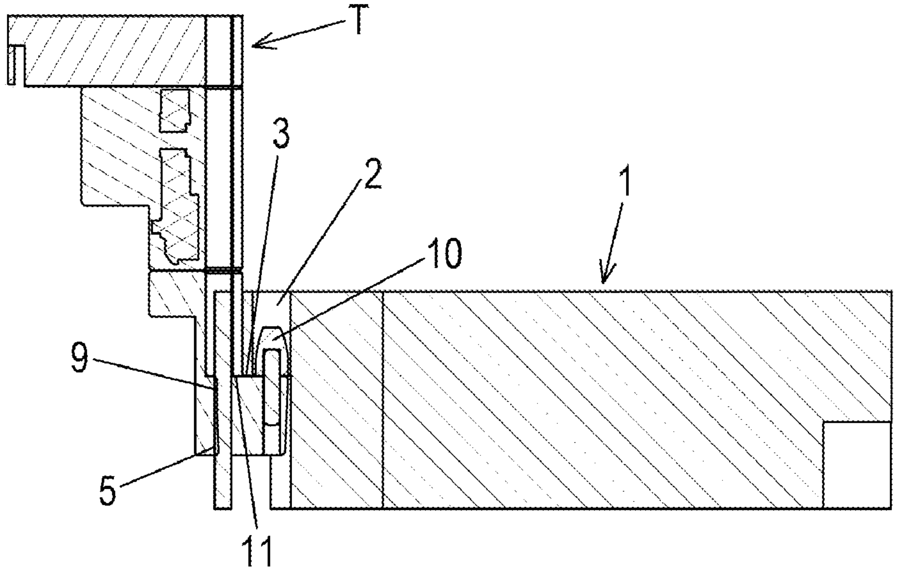

FIG. 3*c* shows a section through the depiction of FIG. 3*b* along the line I-II.

Figure 4A:
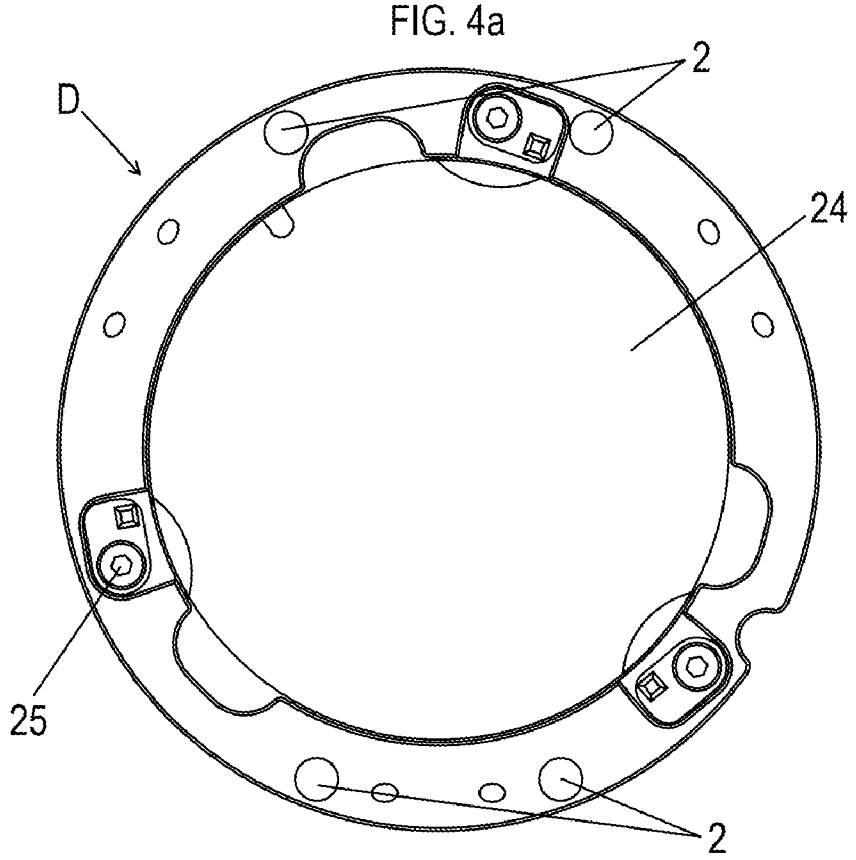

FIG. 4*a* shows a top view of the cover surface of an embodiment variant of a blank according to the invention, in this case a holder having a raw material body clamped in.

Figure 4B:
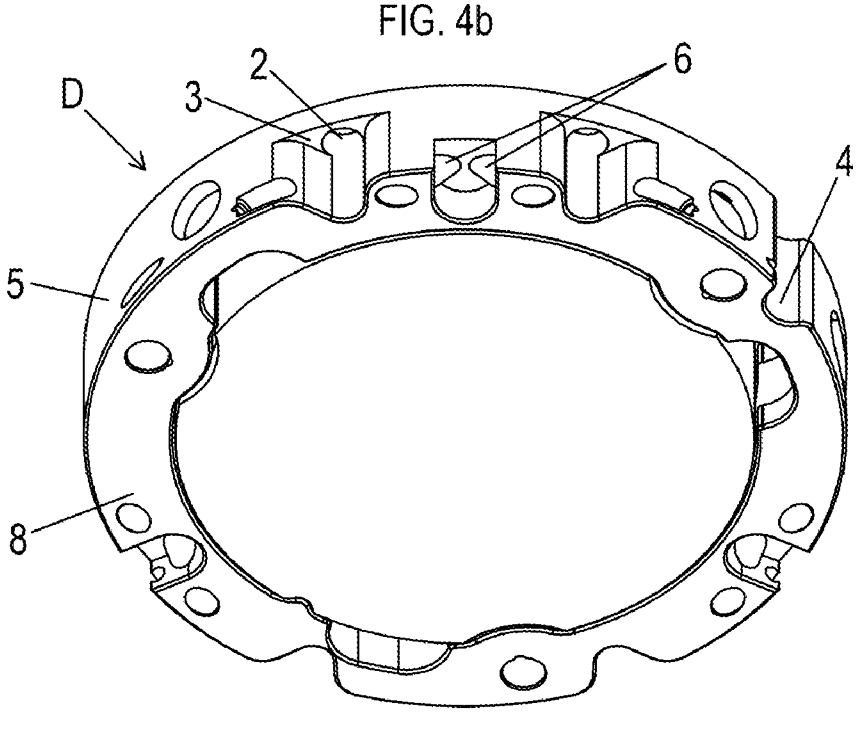

FIG. 4*b* shows an inclined view from the bottom onto the bottom surface of the embodiment variant of FIG. 4*a*.

Figure 5:
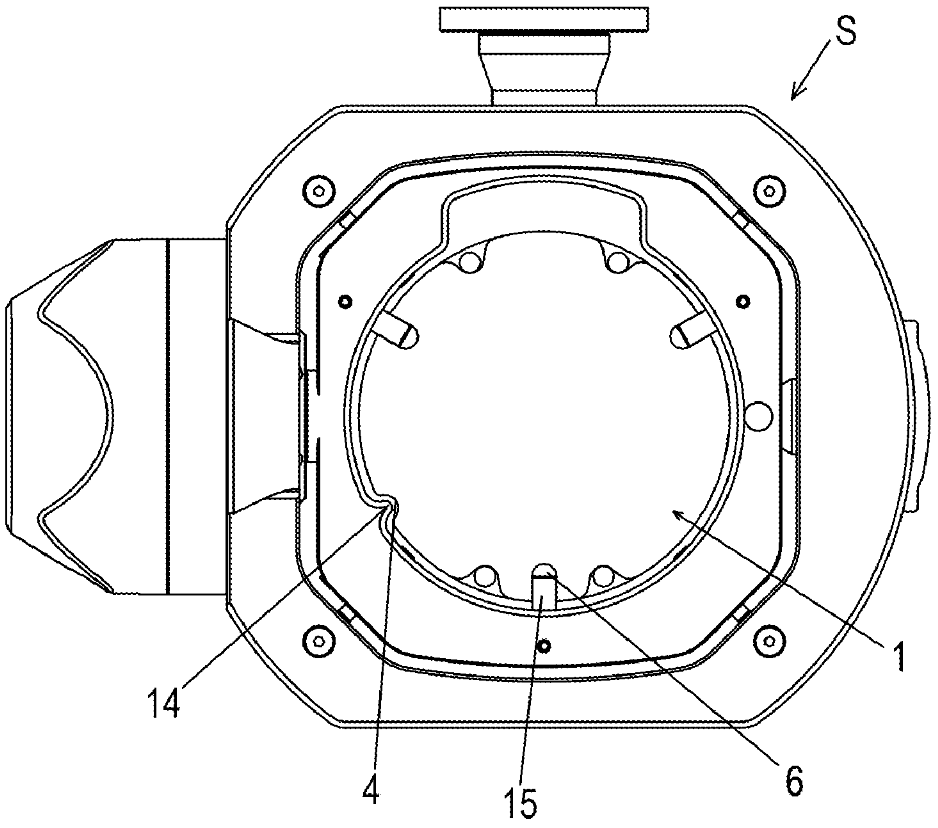

FIG. 5 shows a clamping device according to the invention.

Figure 6A:
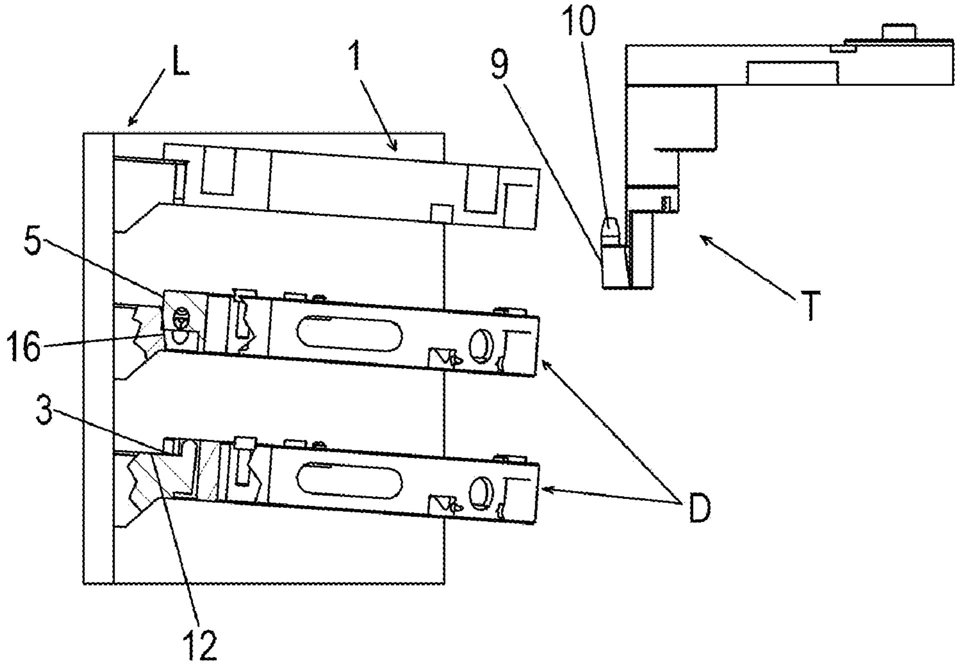

FIG. 6*a* shows a storage system according to the invention having a transport system in a side view.

Figure 6B:
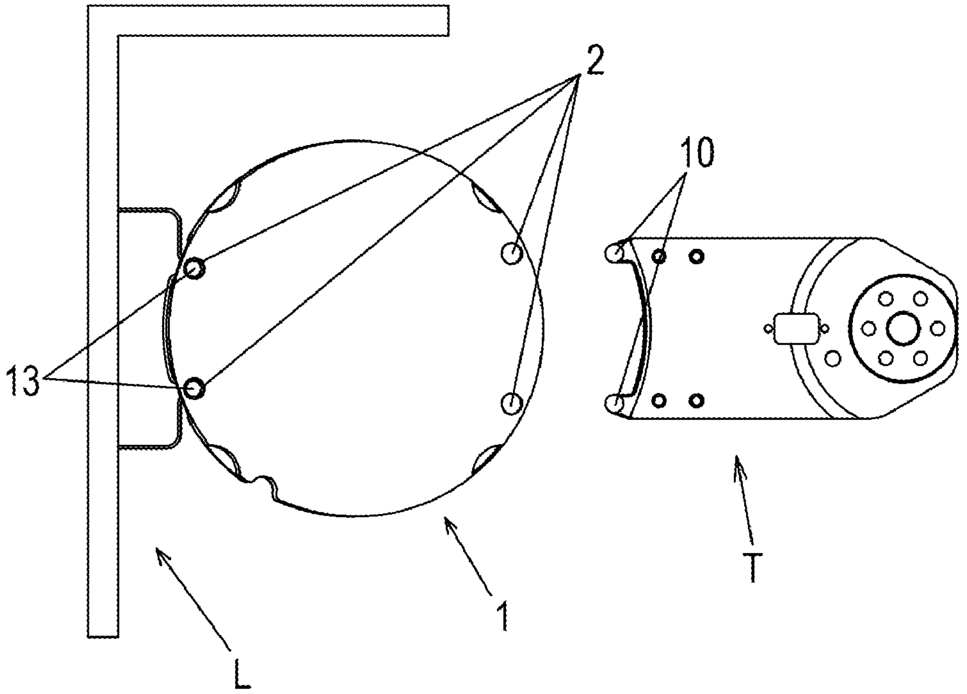

FIG. 6*b* shows a storage system according to the invention having a transport system in a top view.

FIG. 1*a* to 1*c* show a blank 1 according to the invention for a dental element, also called “dental blank” within the scope of the disclosure. The blank 1 comprises a cylindrical base body 5, wherein the base body 5 has a cover surface 7, a bottom surface 8 and an outer surface 20. The base body 5 shown has the shape of an essentially straight circular cylinder, wherein such a shape is advantageous due to symmetry, which will simplify further processing. Other cylinder forms such as, e.g., a cuboid shape, cube shape, pinch shape or elliptical cylinder are also conceivable.

In the outer surface 20, there is inserted a positioning groove 4, which extends across the entire height h of the base body 5. There may also be inserted several positioning grooves 4. There are further provided in the exemplary embodiment shown in total four depressions 2.

Respectively two of these depressions 2 form a pair and are part of the respective receiving member.

The depressions 2 are configured as through-holes and are subsequently provided with the same reference number 2. These extend from the cover surface 7 to the bottom surface 8. The exemplary embodiment shows the preferred form of a through-hole 2 as a bore having a radius r. In the region of the respective through-hole 2, there is provided a groove 21 at the outer surface 20. The groove 21 starts at the bottom surface 8 and extends in the direction of the cover surface 7, running in the same region, in which also runs the through-hole 2, which is configured as a bore.

Each receiving member has two grooves 21, as this will increase stability during transport, storage and positioning (see FIG. 3*a*, 6*a*). In the exemplary embodiment shown, two receiving members are each provided with a pair of depressions 2. Each receiving member then has two grooves 21, which are arranged laterally in the outer surface 20, wherein each groove 21 extends from the bottom surface 8 in the direction of the cover surface 7 and has a certain length, which is smaller than the height h of the base body 5. The groove ends at the height of the support surface h3, measured from the base body centre h/2. Each groove 21 has a support surface 4 at the upper end of the height of the support surface h3, wherein there is provided in each support surface 3 a depression 2 extending in the direction of the cover surface 7.

The groove 21 extends laterally at the outer surface 20 as far as the through-hole 2. In this way, the groove 21 opens the through-hole above the height of the support surface h3 starting from the base body centre h/2 out of the groove 21. The groove 21 has the shape of approximately a semi-circle, wherein in the region of the through-hole 2 it has a curvature radius corresponding to the radius r of the bore (through-hole 2). In this way, it is possible to laterally introduce the transport system, and the groove simultaneously serves as a guidance system for the transport system projections 10 (see also FIG. 3*a*, 3*b*, 6*a*, 6*b*) and the storage system projections 13 (see also FIG. 6*a*, 6*b*).

The transport system T (FIG. 2) has a positioning aid, which has a transport system partial mould 9 matching the outer surface, a transport system support surface 11 matching the support surface and a transport system projection 10 matching the depression. The blank 1 inserted in the transport system T is shown in FIGS. 3*a* and 3*b*, where the matching sections for the form-fit accommodation of the blank 1 in the positioning aid for a transport system are visible.

The second receiving member enables the accommodation of the blank 1 in a storage system L using the respective positioning aid (see FIG. 6*a*, 6*b*). The positioning aid for the storage system comprises:

- a storage system partial mould 16 matching the outer surface 20,
- a storage system support surface 12 matching the support surface 3 and
- a storage system projection 13 matching the depression.

The storage system partial mould 16 matches a section of the cylindrical outer surface 20 of the base body 5.

The groove 21 is limited at the upper end of the height of the support surface (h3) starting from the base body centre (h/2) by the support surface 3. This support surface 3 is configured to be in parallel to the cover surface 7. There are provided two support surfaces 3 per receiving member, which are in parallel to one another and have a defined height h3 of the support surface to the bottom surface 8 starting from the base body centre h/2.

Starting from the cover surface 7, there are provided lateral holding surfaces 22, which are configured as recesses and which extend from the cover surface 7 in the direction of the bottom surface 8 having a clearly defined height—lateral holding surface h1—starting from the base body centre h/2.

There are further provided holding surfaces 6, which are arranged between cover surface 7 and bottom surface 8 having a clearly defined height h2 of the holding surface, starting from the base body centre h/2, wherein there is provided between the holding surface 6 and the bottom surface 8 a recess 23 in the outer surface 20. There are preferably provided several principal holding surfaces 6 (herein three).

The base body 5 consists of a millable raw material, in the case of a dental element for artificial dentition, for example, it comprises plastics.

The two through-holes 2 of the first receiving member have a first distance L1, the two through-holes 2 of the second receiving member have a second distance L2, which is smaller than the first distance L2. Distances L1, L2 of between 20 mm and 200 mm are preferred. The distances L3, L4 of the through-bores 2 of each receiving member may be identical or different in the circumference. One or several positioning grooves 4 may be presented in any form as groove, recess, slit, notch or the like. The positioning groove 4 may extend through the entire height h of the blank, or it may have a predefined distance to the bottom surface 8 and/or the cover surface 7. The positioning groove 5 is preferably presented singularly as a continuous groove. The counter-positioning groove 14 of the clamping device S engages the groove 4 (FIG. 5) and in this way positions the blank 1. The clamping device support points 15 engage the holding surface 6. Together with the lateral holding surfaces 22 and the respective projections in the clamping device S, the blank is held exactly in the clamping device.

The exemplary embodiment of FIGS. 4*a* and 4*b* shows a blank 1 according to the invention for a dental element, analogously to the example of the FIG. 1*a* to 1*c*, with the difference that the base body 5 (different to FIG. 1*a* to 1*c*) is not configured to be single-part but rather that the base body comprises a holder D and millable raw material body 24. The blank 1 is similar to the examples of FIG. 1*a* to 1*c*, the individual components, however, have not been inserted immediately into the single-part base body 5 but rather in the holder D. Reference is to be made to the figure description of FIG. 1*a* to 1*c*. A holder D makes it possible that nearly any raw material body 24 may be inserted into the holder D. The base form of the raw material body 24 may have in particular any form such that the raw material body 24 may also have a different shape. Also any small geometrical differences due to the material used or the production do not have any effect on the geometry of the base body 5 itself. The raw material body 24 in the example shown is connected to the holder D in a releasable manner by means of connection means in the form of grippers 25. The raw material body 24 may comprise zirconium (IV) oxide or other materials such as, for example, plastics. The holding surface 6 is in this exemplary embodiment configured such that exact repositioning is possible.

The holder D assumes similarly the same functions as the single-part base body described in FIG. 1*a* to 1*c* and has the purpose to clamp various raw material bodies 24 having different shapes, sizes and heights such that the complete system may be made more universal.

There may further be provided a label. There may be provided, for example, a QR code as a label, which contains information about the blank 1.

The present invention makes it possible to automatically and mechanically transport, position/clamp and store the blank 1. For this purpose, there are provided, apart from the blank 1 described above, also different systems/devices L, T, S, in which the blank 1 is stored, transported and clamped. These systems/devices L, T, S are compatible with the blank 1.

In this way, the transport system T shown in FIGS. 2 and 3*a* to 3*c* has a transport system partial mould 9 that is compatible with a section of the outer surface 20 of the blank 1 as well as a through-hole 2 including groove 21 and a transport system positioning aid that is congruent with the support surface 3 and having a transport system projection 10 and a transport system support surface 11.

The regions at both positioning aids and blank 1, which are compatible with one another, are intended to centre/position the blank 1 in the transport system T as well as in the storage system L (see FIG. 6*a*, 6*b*).

The transport system T and the storage system L further have a transport system support surface 11 and storage system support surface 12, respectively, which are in parallel to the support surface 3 and are supported when storing/transporting in the respective systems L, T, S. One or several holding surfaces 6 and recesses and/or one or several positioning grooves 4 are required in the clamping device S. The clamping device S, for this purpose, has one or several corresponding counter-positioning projections 14 and counter-support surfaces/points 15, which are compatible with the positioning grooves 4 and support surfaces 6 and, in this way, orient the blank 1 within the clamping device S.

The clamping device S further has in addition one or several clamping device support surfaces 15, which are in number and position compatible with the support surfaces 6 of the blank 1, which may hold the blank within the device S and may also orientate it. Clamping elements press onto the lateral holding surface 22 from the outside, which rigidly clamps the blank 1.

The application is realized as follows: The transport system T moves laterally underneath the blank 1, which is in a fixed (immobile) and defined position in the storage system L. By way of the mutual positioning aids/receiving members, the blank 1 may be centred within the transport system T, and when the transport system T is lifted, the support surface 3 and the transport system support surface 11 collide and act as a lifting surface. In this way, also the base body 5/outer surface 20 and the transport system partial mould 9 collide when the dental blank 1 is lifted in the transport system T. In this way, the position of the blank 1 may be clearly defined, whereby exact transport and positioning are enabled.

The storage system L (FIG. 6*a*, 6*b*) has a magazine for any number of blanks 1 (in the example shown there are three blanks). The blanks 1 are stored one above the other at such a distance that the transport system T with the transport system positioning aid can pick up a blank 1 from below. Conversely, the transport system T can insert a blank 1 into the magazine and transfer it to the storage system positioning aid.

The blank 1 situated in the transport system T is moved to the clamping device S, which is in a clearly defined position. Once the transport system T has reached this position, it will move downwards until the mutual holding surfaces 6 and clamping device support surface/points 15 contact each other. Hereby, the blank 1 may also be approximately oriented in the clamping device S and/or also by the mutual positioning grooves 4, 14. In this way, the blank 1 may now be manually as well as automatically clamped and processed.

Returning a processed blank 1 is realized in the same way as the transport thereto, wherein the transport system T is moved underneath the blank 1 situated in the clamping device S by means of the positioning aids/receiving members. By means of transport system partial mould 9 and outer surface 20 as well as support surface 3, 11, the blank 1 may be positioned and held within the transport system T and returned back into the storage system L.

In order to enable a simple automatized detection of the blanks 1 in the various systems/devices L, T, S, a QR code can be attached to the blank 1, e.g. printed, glued on, lasered or similar. With the help of a QR reader installed in the machine, various key data of the blank 1 may be read.

REFERENCES USED

| | |
|---|---|
| L | Storage system |
| T | Transport system |
| S | Clamping device |
| D | Dental blank holder |
| 1 | Blank |
| 2 | Depression |
| 3 | Support surface |
| 4 | Positioning groove |
| 5 | Base body |
| 6 | Holding surface |
| 7 | Cover surface |
| 8 | Bottom surface |
| 9 | Transport system partial mould |
| 10 | Transport system projection |
| 11 | Transport system support surface |
| 12 | Storage system support surface |
| 13 | Storage system projection |
| 14 | Counter-positioning groove |
| 15 | Clamping device - support surface/point(s) |
| 16 | Storage system partial mould |
| 20 | Outer surface |
| 21 | Groove |
| 22 | Lateral holding surface |
| 23 | Recess(es) |
| 24 | Raw material body |
| 25 | Gripper |
| r | Radius of the depression |
| h | Height of the base body |
| h/2 | Base body centre |
| h1 | Height of the lateral holding surface |
| h2 | Height of the holding surface |
| h3 | Height of the support surface |
| L1 | Distance depression to one another |
| L2 | Distance depression to one another |
| L3 | Distance depression to the outer surface |
| L3 | Distance depression to the outer surface |

The invention claimed is:

1. A blank for producing a dental element, comprising:

a cylindrical base body with a cover surface, a bottom surface and an outer surface;

at least one positioning groove inserted into the outer surface;

a first receiving member and a spaced-apart second receiving member, wherein each receiving member has at least one groove, which is arranged laterally in the outer surface, wherein the at least one groove of each receiving member extends from the bottom surface in the direction of the cover surface and has a length, which is smaller than a height of the base body, wherein the at least one groove of each receiving member has a support surface at an upper end thereof, the support surface being spaced from a center of the base body by a height bearing surface distance, and wherein the length of the at least one groove corresponds to a sum of half of the height of the base body plus the height bearing surface distance; and a depression in the support surface, which extends in the direction of the cover surface.

2. A blank according to claim 1, wherein the depression is a bore having a radius.

3. A blank according to claim 2, wherein the bore is a through-hole, wherein the at least one groove of each receiving member has the shape of approximately a semicircle and has, in the region of the through-hole, a curvature radius corresponding to the radius of the bore.

4. A blank according to claim 1, wherein the support surface is in parallel to the cover surface.

5. A blank according to claim 1, wherein the depression is a through-hole.

6. A blank according to claim 1, wherein each receiving member has at least two grooves.

7. A blank according to claim 1, wherein the at least one groove of each receiving member has a height of the support surface extending from a center of the base body.

8. A blank according to claim 1, further comprising at least one lateral retaining surface, which is configured as a indentation projected from the cover surface in a direction of the bottom surface via a height-side retaining surface from a center of the base body.

9. A blank according to claim 8, further comprising at least two lateral holding surfaces.

10. A blank according to claim 1, further comprising at least one holding surface on a height of the holding surface starting from the base body centre, which is arranged between cover surface and bottom surface, wherein there is provided between the holding surface and the bottom surface a recess within the outer surface.

11. A blank according to claim 1, further comprising at least one holding surface on a height of the holding surface starting from the base body centre, which is arranged between cover surface and bottom surface and is configured to be in parallel to the cover surface, wherein there is provided between the holding surface and the bottom surface a recess within the outer surface.

12. A blank according to claim 1, wherein the base body has the shape of a straight circular cylinder.

13. A blank according to claim 1, wherein the base body comprises a holder and a millable raw material body, wherein the holder is connected to the raw material body in a releasable way.

14. A blank according to claim 1, further comprising a label at the base body.

15. A transport system for a blank according to claim 1, having a transport system positioning aid, wherein the transport system positioning aid has: a transport system partial mould matching the outer surface, a transport system support surface matching the support surface, and at least one transport system projection matching a depression of a respective receiving member.

16. A transport system according to claim 15, further comprising two transport system projections spaced and arranged for being inserted in the depression of the respective receiving member.

17. A storage system or a clamping device for a blank according to claim 1, having a storage system positioning aid, which has: a storage system partial mould matching the outer surface, a storage system support surface matching the support surface, and at least one storage system projection matching the depression of the respective receiving member.

18. A storage system or a clamping device for a blank according to claim 17, further comprising two storage system projections spaced and arranged for being inserted in the depression of the respective receiving member.

* * * * *